UNITED STATES PATENT OFFICE.

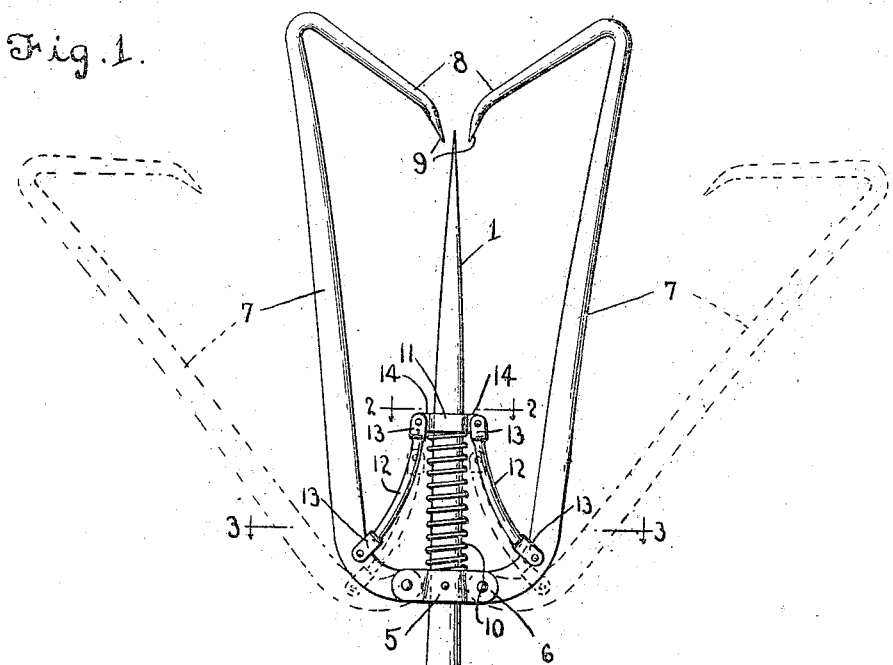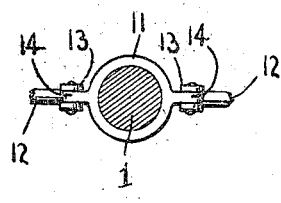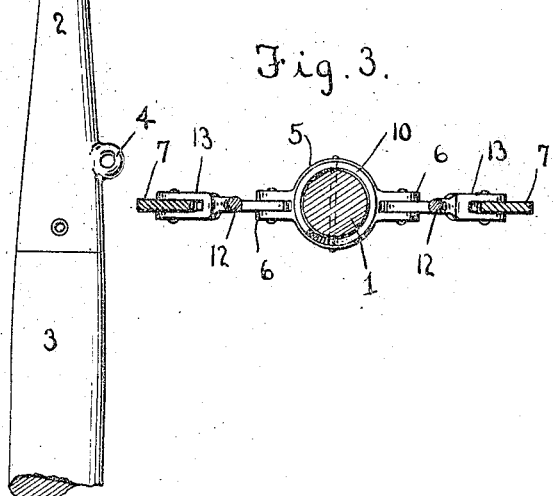

GEORGE T. TURNER, OF IONE, WASHINGTON, ASSIGNOR OF ONE-HALF TO ROBERT B. HALL, OF IONE, WASHINGTON.

FISH-SPEAR.

1,080,868.

Specification of Letters Patent. Patented Dec. 9, 1913.

Application filed April 18, 1913. Serial No. 762,142.

*To all whom it may concern:*

Be it known that I, GEORGE T. TURNER, a citizen of the United States, residing at Ione, in the county of Pend Oreille and State of Washington, have invented certain new and useful Improvements in Fish-Spears; and I do declare the following to be a full, clear, and exact description of the invention, such as will enable others skilled in the art to which it appertains to make and use the same.

This invention relates to improvements in fish spears.

One object of the invention is to provide a fish spear having an improved construction and arrangement of gripping members whereby a fish when struck by the spear will be securely held without being torn or mutilated, and which will permit the removal of the fish from the spear without tearing.

Another object is to provide a spear of this character which will be simple, strong, durable and inexpensive in construction, efficient and reliable in operation and which may also be employed as a gaff and attached by a cord to the boat.

With these and other objects in view, the invention consists of certain novel features of construction, and the combination and arrangement of parts as will be more fully described and claimed.

In the accompanying drawings, Figure 1 is a side view of my improved spear showing in full and dotted lines the manner in which the gripping members of the spear are opened and closed; Fig. 2 is a cross sectional view through the end of the spear taken on the line 2—2 of Fig. 1. Fig. 3 is a similar view taken on the line 3—3 of Fig. 1.

My improved spear comprises a gradually tapering point 1 which is preferably round or may be of any suitable shape in cross section. The point 1 is formed on the end of a socket 2 which is engaged with a handle 3 loose thereon or fastened thereto in any suitable manner. On one side of the socket 2 near the inner end thereof is formed an eye 4 to which may be attached a cord or other flexible connection (not shown) but which may be employed when the spear is loose on its handle and used as a gaff, and which is held in the hand or secured to a boat when the spear is thrown.

Secured to the point of the spear at a suitable distance from the outer end thereof is a ferrule 5 having thereon oppositely projecting parallel apertured bearing ears 6 between which are pivoted the inwardly curved inner ends of gripping members 7 comprising tapered arms or bars the inner ends of which at a suitable distance beyond the end of the point 1 are turned inwardly at an acute angle to form barbs 8, the points of which are turned inwardly to a slight extent adjacent to the end of the point 1 as shown at 9 and are designed to enter the body of the fish when struck by the point of the spear and to thus positively prevent the fish from becoming disengaged from the point of the spear until the gripping members are manually operated to release the points.

The gripping members 7 are yieldingly held in position to cause the barbs 8 thereof to engage the body of the fish when struck by the point of the spear, by a coiled spring 10 which is arranged on the point 1 between the ferrule 5 and a collar 11 which is slidably mounted on the point and is loosely connected with the gripping members 7 near their curved inner ends by links 12 which are slightly curved and have formed on their ends pairs of apertured lugs 13 which embrace and are pivotally connected to the curved ends of the gripping members 7 at one end of the links and to apertured laterally projecting ears 14 formed on the collar 11 at diametrically opposite points as shown. The pressure of the spring 10 when thus arranged is applied to the collar 11 and through the same and the links 12 to the gripping arms 7 to draw and yieldingly hold said members in operative position with respect to the point of the spear, so that said gripping members will automatically operate to grip the fish in the manner described when struck by the point of the spear. The inwardly extending angular barbs 8 also serve to deflect or guide the body of the fish toward the point of the spear when the fish is struck a glancing blow thus causing the point of the spear to squarely penetrate the body of the fish. The arrangement of the barbs 8 on the gripping members 7 is also such that the same may be readily disengaged from the body of the fish without tearing the latter by swinging the members 7 outwardly to the dotted line positions shown in Fig. 1 of the drawing.

In the use of this fish spear, when the same is thrust forward or downward suddenly the sudden movement of the point and the pivots at the inner ends of the members 7 will carry said pivoted ends forward while their bodies swing outward toward the position shown in dotted lines, the point then enters the body of the fish and comes to rest, and the sudden cessation of the forward movement causes the inertia of the members 7 to assist the action of the spring 10 in throwing said members and barbs 8 inward into positions where their tips 9 will coact with the tip of the point 1 to hold the fish thereon. In removing the fish from the spear it is only necessary to press its body upward against the collar 11 which is the natural movement of disengaging its body from the tip 9, and when the collar 11 is pressed toward the ferrule 5 the members 7 are automatically swung outward to the dotted-lined positions where they can be held by hand while the body of the fish is slipped off the point 1. Therefore I consider it of advantage to dispose the spring 10 and collar 11 forward of or beyond the ferrule 5, rather than behind it.

By constructing my improved spear as herein shown and described the same may also be employed as a gaff and when so employed the ferrule 2 has a loose engagement with the end of the handle and a cord is attached to the eye 4 of the ferrule and fastened to the boat or otherwise secured as hereinbefore described.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

The herein described fish spear comprising a handle, a point carried thereby, a ferrule fast on the point, a collar slidably mounted on the point between the ferrule and the tip of the point, an expansive spring coiled on the latter between said ferrule and collar, gripping members whose inner ends are pivoted to said ferrule and whose outer ends are turned inward into barbs having tips coacting with the tip of said point, and links pivotally connecting said members near their tips with said collar, the whole constructed substantially as and for the purpose described.

In testimony whereof I have hereunto set my hand in presence of two subscribing witnesses.

GEORGE T. TURNER.

Witnesses:
R. B. HALL,
W. E. WEEKS.

---

Copies of this patent may be obtained for five cents each, by addressing the "Commissioner of Patents, Washington, D. C."